United States Patent [19]
Hawley et al.

[11] 3,892,963
[45] July 1, 1975

[54] TRANSDUCER FOR A DISPLAY-ORIENTED POINTING DEVICE

[75] Inventors: Jack S. Hawley, Berkeley; Roger D. Bates, Sunnyvale; Charles P. Thacker, Los Altos, all of Calif.

[73] Assignee: Xerox Corporation, Stamford, Conn.

[22] Filed: Dec. 20, 1973

[21] Appl. No.: 426,847

[52] U.S. Cl.............. 250/231 R; 250/233; 250/239; 33/1 M
[51] Int. Cl. ............................................ G01d 5/34
[58] Field of Search .......... 250/233, 231 SE, 231 R, 250/239; 178/18; 33/141 R, 1 M, 175 A; 340/324 R

[56] References Cited
UNITED STATES PATENTS

| | | | |
|---|---|---|---|
| 3,187,187 | 6/1965 | Wingate | 250/233 X |
| 3,309,525 | 3/1967 | Johnson, Jr. | 250/233 X |
| 3,497,959 | 3/1970 | Engelsman | 250/233 X |
| 3,541,541 | 11/1970 | Engelbadt | 340/354 X |
| 3,628,038 | 12/1971 | Culver et al. | 250/233 |

*Primary Examiner*—Walter Stolwein
*Attorney, Agent, or Firm*—James J. Ralabate; Terry J. Anderson; John H. Chapman

[57] ABSTRACT

A positional transducer element and an orientation of two positional transducer elements within an X-Y position indicator for a display system. An X-Y position indicator which may control the movement of a cursor over a display on a cathode ray tube. Signals are generated from the indicator indicating its position to cause the cursor to be displayed on the tube at a corresponding position. X and Y position wheels are mounted within the indicator at a predetermined relationship to each other and a contact surface for rotation according to the X and Y movements of the indicator. The X and Y wheels are respectively coupled to transducer elements which translate the rotation of the wheels into X and Y positional signals.

24 Claims, 6 Drawing Figures

TRANSDUCER FOR A DISPLAY-ORIENTED POINTING DEVICE

BACKGROUND OF THE INVENTION

The invention relates to a pointing device for use with visual display systems and, more particularly, to transducer elements for such devices to translate the movement of the indicator device into positional signals for controlling the movement of a cursor on display.

U.S. Pat. No. 3,541,541, to Engelbart teaches such a device with various transducer elements for converting positional movement of a device to positional signals for utilization by a display device. In one embodiment, a potentiometer is connected to each of two wheels on an indicator device for generating signals indicating rotation of the wheels. Another embodiment uses a shaft position encoder which produces a digital output corresponding to the angular position of a disc. The use of the disc arrangement would allow a direct digital output, instead of the analog output of the first embodiment which must be digitally converted to be used by the computer control in the CRT display. The present invention teaches the use of still another transducer element for generating positional signals indicative of the respective rotation of the indicator wheels.

It is thus an object of the present invention to provide an improved transducer element for an X–Y position indicator device.

Other objects of the invention will be evident from the description hereinafter presented.

SUMMARY OF THE INVENTION

The invention provides a transducer element and additionally orientation of two such transducer elements which are respectively connected to positional wheels constituting transport means for an indicator device which is utilized to control the movement of a cursor over the display on a CRT device. Each such transducer element is an electro-mechanical device using a light source and two light shutters, activated by moving the indicator device on a support surface thereby causing relative rotation of the respective transport wheel. Such movement of the wheel produces two trains of light pulses which may be decoded into motion and direction of motion of its corresponding transducer and thereby the X–Y positional movements of the indicator device.

Another feature of the invention is that one of these shutters is fixed, while the other shutter concentric with the first rotates. The rotating shutter contains a plurality of equal dimensioned and equally spaced slits about its periphery. The fixed shutter contains a fewer number of slits in its outer periphery than that of the rotating shutter. These slits are narrower than the width of the slits in the periphery of the rotating shutter.

Still another feature of the invention is that the rotating shutter is disposed within the fixed shutter with its slits in cooperative arrangement with the slits of the fixed shutter to allow radiation from a light source within the rotating shutter to be intermittantly passed through the slits in the fixed shutter.

Yet another feature of the present invention is that the slits on the fixed shutter are arranged in two groups respective to photosensitive elements which are responsive to the radiation of light emitted through the slits, which photosensitive elements generate signals respective to each of the groups which are 90° out of phase with each other. This phase relationship is used to determine the direction of rotation of the rotating shutter and hence the direction of the transport wheel.

Another feature of the present invention is that the axes of the respective X and Y transport wheels have respective horizontal coordinates which are perpendicular to each other. Further, the axes of the wheels themselves are disposed at a 30° angle from the contact surface upon which the indicator device travels. Thereby, the transport wheels rotate in respective planes which are at an angle of 60° to the surface of the supporting medium.

These and other features which are considered to be characteristic of this invention are set forth with particularity in the appended claims. The invention itself, however, as well as additional objects and advantages thereof, will best be understood in the following description when considered in conjunction with the accompanying drawings.

DESCRIPTION OF THE PREFERRED EMBODIMENT

Figure 1:
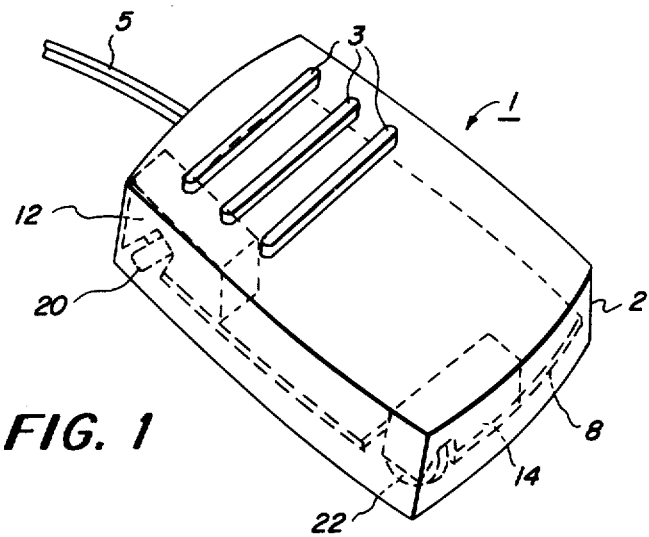
FIG. 1 is a top perspective view of an indicator device which would utilize the transducer elements of the present invention.

In FIG. 1 is shown an indicator device 1 which incorporates the features of the invention. Located in the top of the housing 2 of the device 1 are control buttons 3 which are provided for closing switches (not shown) which send pulses through a cable 5 to signal certain changes in the displayed information on a display monitor (not shown). A horizontal support plane 8 is mounted in fixed relation to the inside of the housing 2 to support transducer elements 12 and 14.

Figure 2:
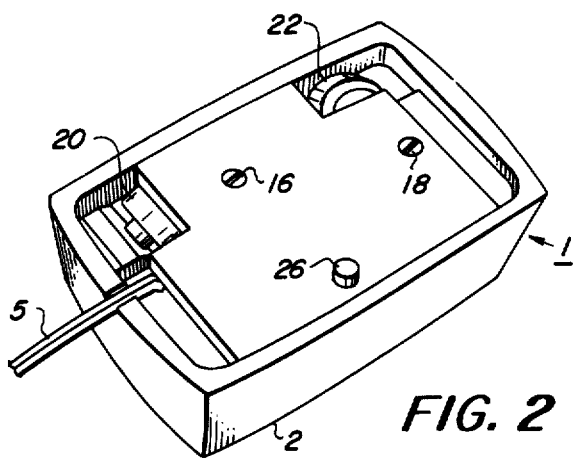
FIG. 2 is a bottom perspective view of the indicator device of FIG. 1 illustrating the orientation of the X and Y rotational wheels of the device.

The transducer elements 12 and 14 are mounted by respective screws 16 and 18 to the support plane 8, as shown in FIG. 2. Transport wheels 20 and 22 are coupled to the transducers 12 and 14, respectively. The wheels 20 and 22 in combination with a support stem 26 allows the indicator device 1 to be supported on a supporting surface, such as a table, in a tripodal configuration. The radius of the wheels 20 and 22 and the length of the stem 26 are selected such that the indicator device 1 is in horizontal relationship with a horizontal supporting surface. As the indicator device 1 is moved about a supporting surface, the wheels rotate in accordance with the X and Y coordinate directions of travel in contact with the surface. In this context, the angular motion of the transport wheel 20 would represent the X coordinate of movement of the device 1 and the transport wheel 22 would represent the Y coordinate of motion.

Figure 3:
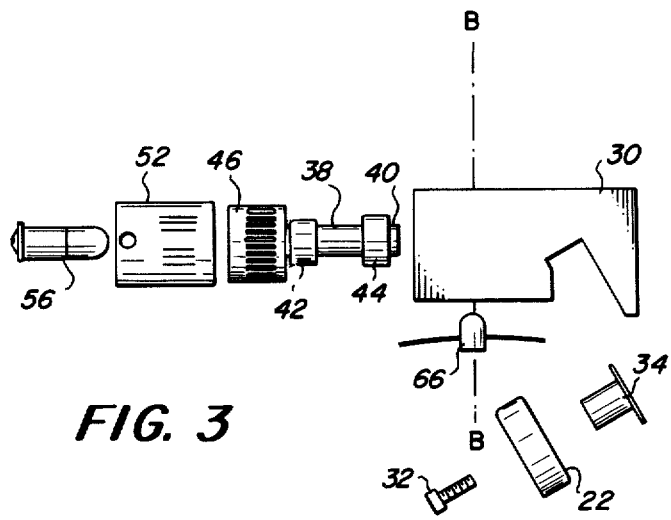
FIG. 3 is a side exploded view of a transducer element and a respective transport wheel.

Shown in FIG. 3 is an exploded side view of a given transport wheel 22 in relation to the transducer element 14 to which it is coupled. The wheel 22 is rotatably mounted to a transducer housing 30 by means of a screw 32 and a flanged shaft 34. Rotation of the wheel 22, when mounted to the housing 30, contacts a roller 38 which is made of hardened steel. The rotation of the wheel 22 is thereby transferred to the roller 38 which is snugly fitted over a shaft 40. The roller 38 is retained on the shaft 40 by means of respective ball bearings 42 and 44 on either side which are secured by a screw 48. A shutter 46 is integral with one end of the shaft 40 adjacent the bearing 42 to complete a rotating shutter assembly. The screw 48 is sufficiently tightened to ensure that the inner-races of the bearings 42 and 44, the roller 38, and the shaft 40 are in fixed contact with one another. Thereby, the rotation of the roller 38 imparted by the rotation of the wheel 22 turns the rotating shutter 46.

A fixed shutter 52, having a larger diameter than that of the rotating shutter 46, is mounted to inner surfaces of the housing 30 such that it is concentric with the rotating shutter 46. At the outer end of the shutter 52 is mounted a lamp 56 which protrudes within the shutter 46 to provide a source of light therein. As also shown in the bottom corresponding view of FIG. 4, the rotating shutter 46 has a plurality of slits which are disposed about the periphery of the shutter at equal angular intervals. The slits are at a distance X from each other and have a width of approximately ½ X. In this preferred embodiment, the slit size is approximately 21 mils × 0.20 inches. The fixed shutter 52 contains two groups of slits, which slits of a given group have the same angular disposition as the shutter 46; however, the angular disposition between slits of different groups is offset by ¼ of an angular interval or multiple thereof. Each group of slits of the shutter 52 cooperates with a respective channel 60 at which end is disposed a photosensitive element 66, such as a phototransistor, which is responsive to any coincidence between slits of the rotating shutter 46 and the fixed shutter 52 which would permit radiated light from the lamp 56 through a respective channel 60 to impinge on the photosensitive element 66.

In this preferred embodiment, the photosensitive element 66 is a phototransistor specified in accordance with the element characteristics of a Motorola MRD 450 transistor. With the incidence of light upon the phototransistor 66, current would flow from the collector to the emitter to generate a signal whose transitions indicate the rotation of the transport wheel 22. Since the narrowness of the slits of the shutter 46 is equal to half the distance between the slits, the output signal envelope generated from a transistor 66 is half on and half off during the rotation of the wheel 22. Three slits constitute each group of slits in the shutter 52, each slit having a narrowness as small as possible in relation to the sensitivity of the transistor 66. Due to these practical considerations, however, the slits of the shutter 52 have been defined at approximately ⅓ the narrowness of the slits in the shutter 46. In this preferred embodiment, then, the slits are 7 mils narrow and approximately 0.25 inches long. The relative narrowness of slits in the respective shutters 46 and 52 minimize transitional gradients in the light intensity which would otherwise occur between the coincidence in slits, which tends to cause ambiguity in the switching of the transistor 66.

Figure 4:
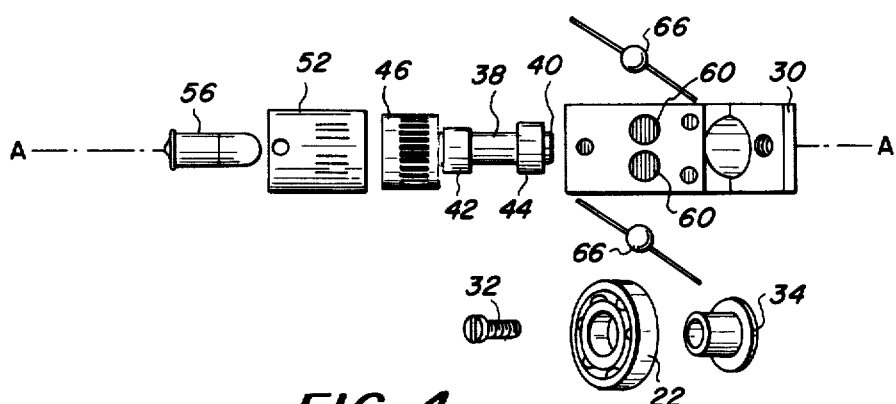
FIG. 4 is a bottom exploded view of the transducer element shown in FIG. 3 in relation to its respective transport wheel.
Figure 5:
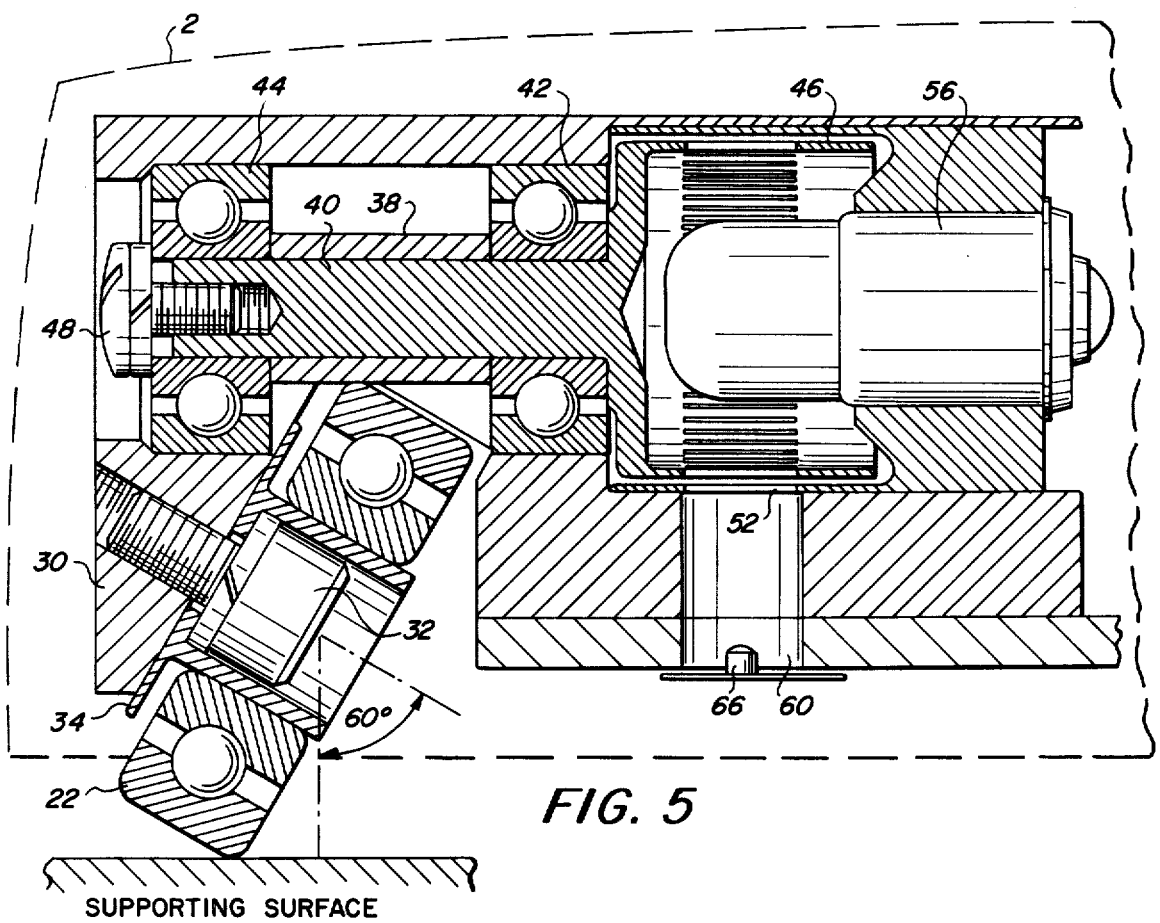
FIG. 5 is a cross-sectional view of the assembled transducer element shown in FIG. 4 along line A—A in cooperation with its respective transport wheel which is in contact with a supporting surface.
Figure 6:
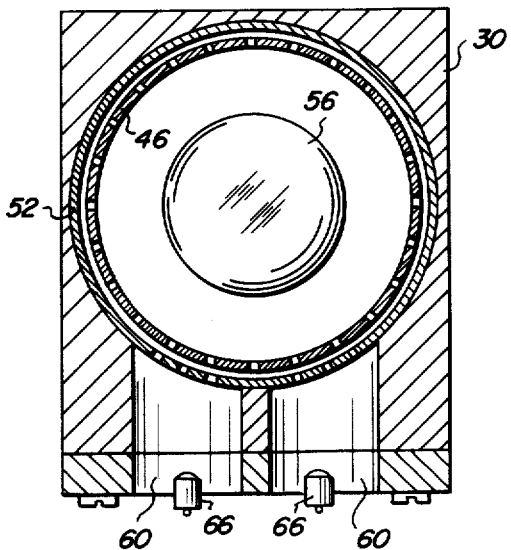
FIG. 6 is a cross-sectional view of the assembled transducer element shown in FIG. 3 along the line B—B.

In FIG. 5 is shown a cross section of the assembled transducer element 14 shown in FIG. 4 along the line A—A. The relative disposition of the shutters 46 and 52, the sleeve 40, the transport wheel 22, and the housing 30 are clearly shown. In FIG. 6 is shown a cross section of the assembled transducer element 14 shown in FIG. 3 along the line B—B. The relative disposition of slits in the respective shutters 46 and 52 in relation to the channel 60 and the transistor 66 are clearly shown.

The number of slits in the rotating shutter determines the number of output pulses generated by the transistor 66 per unit distance travelled by the indicator device 1 on the supporting surface. In this preferred embodiment, 30 slits are defined in the periphery of the shutter 46 which would yield an output from the respective transistor 60 at 50 pulses per inch travelled by the indicator device 1 on the supporting surface. Since the output envelope from a transistor 66 is 50 percent on and off, the output signals representative of the rotation of the wheel 22 is approximate to a square wave with a 50 percent duty cycle. Since the groups of slits of the shutter 52 are angularly offset by a difference of ¼ of an angular interval between slits, one square wave generated from one of the transistors 66 would lead the other by 90° phase difference. The direction of rotation of the wheel 22 is thus determined by which transistor output leads the other by this phase difference.

The transport wheel 22 in this preferred embodiment is a ball bearing assembly made of steel whose innerrace is axially journaled to the fixed shaft 34, as shown in FIG. 5. Due to the angular relationship between the roller 38 and the shaft 34, the wheel 22 maintains contact with said roller 38 by means of the natural force transmitted from the supporting surface when the device 1 is in operation. The wheel 22, thus arranged, provides a low friction rotation which effectively transfers the positional movement of the indicator device 1 about the supporting surface. This aforesaid mounting of the wheel 22 to the housing 30 is such that the wheel 22 lies in a plane which is approximately 60° to the surface of the supporting medium. This angular disposition of the wheel 22 between the supporting surface and the roller 38 enhances the transfer of radial motion from the wheel to the roller 38 without the need for additional mechanical elements as biasing springs, which themselves dissipate rotational forces by producing undesirable rolling friction losses. The range of feasible angular orientation of the wheel plane in relation to the supporting surface is between 50° and 70°. The contact edges of the wheel 22 are rounded with an approximate radius of 20 to 25 mils to permit an appropriate slither of the wheel 22 on the supporting surface such that the wheel 22 will pick up the true value of its X or Y coordinate of motion of the indicator device 1 and transmit this value through its coupling to the rotating shutter 46.

While FIGS. 3–6 were illustrative of the transducer element 14 and the transport wheel 22, the same illustrations are indicative of the structure and operation of the transducer element 12 and its respective transport wheel 20. Since the horizontal component of the axes of respective wheels 20 and 22 are orthogonal to one another, the transport wheel 20 is disposed to pick up the movement of the device 1 which is expressed in a coordinate direction 90° from that picked up by the transport wheel 22.

Obviously, many modifications of the present invention are possible in light of the above teaching. It is therefore to be understood that, in the scope of the appended claims, the invention may be practiced other than as specifically described.

What is claimed is:

1. A transducer element coupled to a wheel for translating rotational movement of the wheel into electrical signals indicative of its rotation, comprising:

first shutter means having a plurality of slits spaced equidistant from one another about its periphery;

a light source disposed on one side of said first shutter means for generating light to pass through the slits of said first shutter means;

second shutter means disposed concentric with and on the other side of said first shutter means having at least two groups of slits about its periphery, the total number of slits being fewer than said plurality of slits in said first shutter means, for passing light passing through said plurality of slits directed into at least two channels of light upon the coincidence of slits of said plurality and slits of said two groups;

the slits of said two groups being substantially narrower than the slits of said plurality; and photosensitive means responsive to said channels of light for generating electrical signals respective to each of said channels, said wheel coupled to said first shutter means such that said first shutter means moves relative to said second shutter means in accordance with the rotation of said wheel whereby said respective signals are expressed as streams of discrete pulses.

2. The element defined in claim 1 wherein said first and second shutter means have circular peripheries spaced concentric with one another.

3. The element defined in claim 2 wherein the slits of said plurality associated with said first shutter means are disposed at equal angular intervals from one another and said slits of a given group associated with said second shutter means are disposed from one another by the same angular interval.

4. The element defined in claim 3 wherein the slits of a given group are off-set from the slits of the other group by one-quarter of an angular interval whereby said pulse streams are 90° out of phase with one another.

5. The element defined in claim 4 wherein the narrowness of the slits of said plurality is approximately equal to one-half the distance between them.

6. The element defined in claim 5 wherein the narrowness of the slits of said groups is approximately equal to one-third the narrowness of the slits of said plurality.

7. A position indicator device for electronically representing its positional movement over a supporting surface, comprising:

a housing;

two transducer elements mounted to said housing for converting mechanical motion to electrical signals;

at least two wheels for supporting and moving said housing over the supporting surface, each of said wheels respectively coupled to one of said transducer elements with the horizontal components of the axes of said wheels substantially orthogonal to one another whereby the rotation of one of said coupled wheels represents the X coordinate of movement over the surface and the rotation of the other coupled wheel represents the Y coordinate of movement;

and the axes of said wheels being angularly disposed such that said wheels lie in a plane which is at an angle of between 50°–70° to the supporting surface.

8. The indicator device as defined in claim 7 wherein said wheels lie in a plane which is at an angle of approximately 60° to the supporting surface.

9. The indicator device as defined in claim 7 wherein said transducer elements are comprised of first shutter means having a plurality of slits spaced equidistant from one another about its periphery;

a light source disposed on one side of said first shutter means for generating light to pass through the slits of said first shutter means;

second shutter means disposed concentric with and on the other side of said first shutter means having at least two groups of slits about its periphery, the total number of slits being fewer than said plurality of slits in said first shutter means, for passing light passing through said plurality of slits directed into at least two channels of light upon the coincidence of slits of said plurality and slits of said two groups, the slits of said two groups being substantially narrower than the slits of said plurality; and photosensitive means responsive to said channels of light for generating electrical signals respective to each of said channels;

and wherein said first shutter means has a portion of which is disposed in frictional contact with its respective wheel in substantially the same angular relationship with said wheel as said wheel is to the supporting surface such that said first shutter means moves relative to said second shutter means in accordance with the rotation of its respective wheel whereby two sets of signals, each set comprised of respective signals expressed as streams of discrete pulses generated from a respective transducer element, represent the X and Y coordinates of movement, respectively.

10. The device as defined in claim 9 wherein the first and second shutter means of said transducer elements have circular peripheries spaced concentric with one another.

11. The device as defined in claim 10 wherein the slits of said plurality associated with said first shutter means are disposed at equal angular intervals from one another and said slits of a given group associated with said second shutter means are disposed from one another by the same angular interval.

12. The device as defined in claim 11 wherein the slits of a given group are off-set from the slits of the other group by one-quarter of an angular interval whereby said pulse streams are 90° out of phase with one another.

13. The device as defined in claim 12 wherein the narrowness of the slits of said plurality is approximately equal to one-half the distance between them.

14. The device as defined in claim 13 wherein the narrowness of the slits of said groups is approximately equal to one-third the narrowness of the slits of said plurality.

15. The device as defined in claim 14 wherein said wheels lie in a plane which is at an angle of approximately 60° to the supporting surface.

16. A position indicator device for electronically representing its positional movement over a supporting surface, comprising:
a housing;
two transducer elements mounted to said housing for converting mechanical motion to electrical signals, said transducer elements comprised of
first shutter means having a plurality of slits spaced from one another about its periphery,
a light source disposed on one side of said first shutter means for generating light to pass through the slits of said first shutter means,
second shutter means disposed concentric with and on the other side of said first shutter means having at least two groups of slits about its periphery, the total number of slits being fewer than said plurality of slits in said first shutter means, for passing light passing through said plurality of slits directed into at least two channels of light upon the coincidence of slits of said plurality and slits of said two groups;
photosensitive means responsive to said channels of light for generating electrical signals respective to each of said channels;
at least two wheels for supporting and moving said housing over the supporting surface,
each of said wheels respectively coupled to one of said transducer elements with the horizontal components of the axes of said wheels substantially orthogonal to one another whereby the rotation of one of said coupled wheels represents the X coordinate of movement over the surface and the rotation of the other coupled wheel represents the Y coordinate of movement; and
said first shutter means has a portion of which is disposed in frictional contact with its respective wheel in substantially the same angular relationship with said wheel as said wheel is to the supporting surface such that said first shutter means moves relative to said second shutter means in accordance with the rotation of its respective wheel whereby two sets of signals, each set comprised of respective signals expressed as streams of discrete pulses generated from a respective transducer element, represent the X and Y coordinates of movement, respectively.

17. The device as defined in claim 16 wherein is further included flanged shafts affixed to said housing for rotatably mounting said wheels at an angular disposition such that the frictional contact with said said first shutter means is maintained.

18. The device as defined in claim 17 wherein the axes of said wheels are angularly disposed such that said wheels lie in a plane which is at an angle of between 50°–70° to the supporting surface.

19. The device as defined in claim 18 wherein said wheels lie in a plane which is at an angle of approximately 60° to the supporting surface.

20. The device as defined in claim 19 wherein the slits of said two groups are substantially narrower than the slits of said plurality;

21. The device as defined in claim 20 wherein the slits of a given group are off-set from the slits of the other group by one-quarter of an angular interval whereby said pulse streams are 90° out of phase with one another.

22. The device as defined in claim 21 wherein the narrowness of the slits of said plurality is approximately equal to one-half the distance between them.

23. The device as defined in claim 22 wherein the narrowness of the slits of said groups is approximately equal to one-third the narrowness of the slits of said plurality.

24. The device as defined in claim 18 wherein the contact edges of said wheels are rounded with an approximate radius of 20 to 25 mils.

* * * * *